United States Patent [19]
Takahashi et al.

[11] Patent Number: 4,470,136
[45] Date of Patent: Sep. 4, 1984

[54] AUTOMATIC RECORD DISC LOADING PLAYERS

[75] Inventors: Hideyuki Takahashi; Isami Kenmotsu, both of Saitama, Japan

[73] Assignee: Pioneer Electronic Corporation, Tokyo, Japan

[21] Appl. No.: 322,136

[22] Filed: Nov. 17, 1981

[30] Foreign Application Priority Data

Nov. 19, 1980 [JP] Japan .................................. 55-163955

[51] Int. Cl.³ .......................................... G11B 17/04
[52] U.S. Cl. .................................. 369/77.1; 369/191; 369/194
[58] Field of Search ................. 369/75, 191, 194, 186, 369/184, 226, 77, 75.2

[56] References Cited

U.S. PATENT DOCUMENTS

| | | | | |
|---|---|---|---|---|
| 3,360,270 | 12/1967 | Nester | ................................. | 369/207 |
| 3,403,914 | 10/1968 | Osborn | ................................. | 369/207 |
| 3,515,392 | 6/1970 | Kitahara | ................................. | 369/207 |
| 3,594,009 | 7/1971 | Cerudo | ................................. | 369/207 |
| 3,869,130 | 3/1975 | Igata | ..................................... | 369/207 |
| 4,113,263 | 9/1978 | Takizawa | ............................. | 369/226 |
| 4,340,952 | 7/1982 | Ikedo | .................................... | 369/77.1 |

*Primary Examiner*—Steven L. Stephan
*Attorney, Agent, or Firm*—Sughrue, Mion, Zinn, Macpeak and Seas

[57] ABSTRACT

An automatic record loading player has a pair of racks and a pair of rollers for centering an inserted record disc. A slidable stop plate is movable back and forth and cooperates with a record disc detecting arm biased in one direction and rotatable in abutment with a circumferential periphery of the record disc. Any size record disc having any size center hole may be suitably positioned and delivered into and from the record player. A movable spindle assembly is used for holding and delivering the record disc. The record disc is held at its center hole by the spindle assembly. A novel drive cam mechanism and a novel drive direction change-over device are also disclosed. Through such gearing mechanisms, the record disc may be transferred along a groove mechanism for the spindle assembly.

20 Claims, 32 Drawing Figures

AUTOMATIC RECORD DISC LOADING PLAYERS

BACKGROUND OF THE INVENTION

Hitherto, there have been various automatic record disc loading players. Most such record players have clamping and holder means for holding a record disc at its circumferential or outer periphery. These holding means may disadvantageously cause damage to the record disc. The physical size of the record disc player is also necessarily large due to the provision of the record holding mechanism.

Also, there have been some automatic record disc loading players having holding means for holding a record disc at a center hole edge thereof. In such players, in playing an EP record disc, a relatively large diameter spindle must be used instead of a relatively small diameter spindle. This makes it difficult to construct such a holding mechanism. In addition, an intricate manipulation of the adapter and the spindle is needed before record disc insertion.

In the prior art automatic loading players, the record transferring mechanism requires a drive motor in addition to a phono motor, the drive motor changing its rotational direction in accordance with the switching of the operation of the record transferring mechanism. Alternatively, if the record disc transferring mechanism is driven by a rotational torque derived from a turntable shaft, the drive direction change-over mechanism becomes large in size and intricate without a high mechanical reliability.

In the prior art automatic players, the play position of the record disc is close to the initial loading position of the record disc. This causes the record change and setting operation to be difficult. Also, in the prior art automatic loading players, it is difficult to exactly center the record disc at a predetermined setting position. To this end, upon completion of the centering or setting, a member used for centering the record disc must be moved from a position where the member for centering may abut against the record disc. In order to satisfy this requirement, the record disc players are enlarged in size. This problem is serious if a large diameter record disc is used.

SUMMARY OF THE INVENTION

In order to overcome the above noted various disadvantages inherent in the prior art automatic record disc loading mechanisms, an object of the present invention is to provide a novel automatic record disc loading player.

The present invention provides an automatic record loading player comprising a center spindle engageable with a relatively small center hole of a record disc; first holder means for holding the record disc at the center hole thereof, the first holder means being retractable into and projectable from the center spindle; an adapter assembly engageable with a relatively large center hole of a record disc, the adapter assembly being formed coaxially with the first holder means; and a second holder means retractable into and projectable from the adapter assembly, wherein the second holder means selectively cooperates with the first holder means.

According to another aspect of the invention, an automatic record loading player comprises means for delivering a record disc from a first position to a second position; drive cam means selectively engaging with a turntable shaft and alternately rotating or stopping by every one half rotation, said drive cam means including coaxial slide surfaces provided on its circumferential periphery corresponding to every one half rotation; and drive direction change-over assembly for contacting with said slide surfaces and transmitting a rotational torque of said drive cam means to said means for delivering whereby the drive direction of said means for delivering is changed by every one half rotation of said drive cam.

In one embodiment of the invention, an automatic record disc loading player comprises a turntable; a spindle assembly for holding a record disc at a center hole thereof; and drive guide means for transferring said spindle assembly along stationary guide grooves between a record disc insertion position and a position above the turntable.

The present invention provides an automatic record disc loading player comprising; a pair of racks moving in the opposite direction to each other, said racks being slidably supported in a lateral direction; two guide rollers for contacting with an outer periphery of a record disc, said guide rollers being each provided on said racks; a slide stop plate movable back and forth; a record disc detecting pin for abutting against the outer periphery of the record disc, said record disc detecting pin being movable in correspondence with movement of said slide stop plate; a lock pin formed on one end portion of one of said racks; and a guide wall formed in said slide stop plate and obliquely formed in the moving direction of said slide stop plate, said guide wall being abuttable against said lock pin; whereby an inserted record disc of any size can be suitably centered at a predetermined position.

In one embodiment, a plurality of projections extend from said slide stop plate, and are positioned on the rear side of said guide wall so that the projections may be brought into contact with the lock pin when the record disc is delivered to the outside, so that when the record disc is delivered to the outside, the slide stop plate is moved forwardly until said lock pin comes into contact with the projection and the record disc is pushed forwardly from the centering position of the record disc by the record disc detecting pin.

In the preferred embodiment, in accordance with the size of the record disc, the lock pin is retained by the suitably selected retaining portion of the lock plate.

DESCRIPTION OF THE PREFERRED EMBODIMENTS

The present invention will now be described in detail with reference to the accompanying drawings.

An opening through which a record disc is inserted is formed in a front surface of a player cabinet. A centering mechanism for detecting the size of the record disc inserted and for centering the record disc is provided on an inner surface of an upper plate of the cabinet in the vicinity of the above described opening. A turntable is provided on the rear side of the player cabinet. A center spindle mechanism is provided on the upper side of the player cabinet for holding the centered record disc at its center hole and for transferring it to the turntable.

Figure 1:
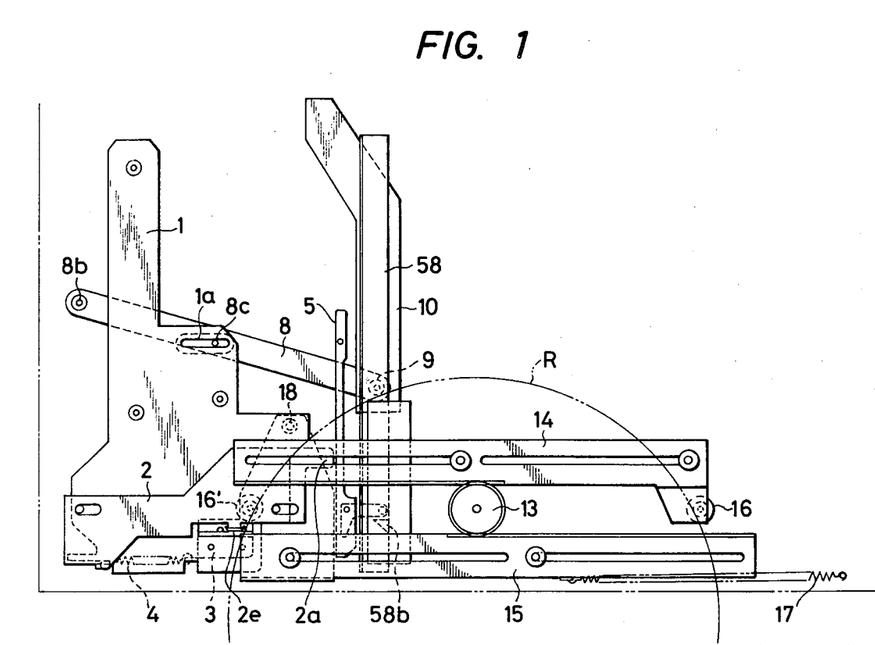
FIG. 1 is a plan view showing a centering mechanism according to the present invention.
Figure 2:
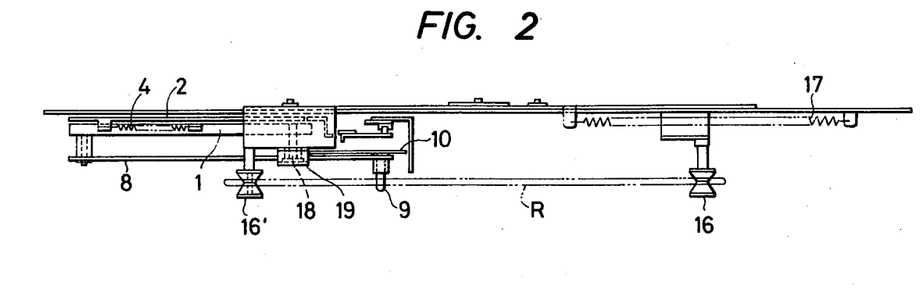
FIG. 2 is a front view showing the centering mechanism shown in FIG. 1.
Figure 3:
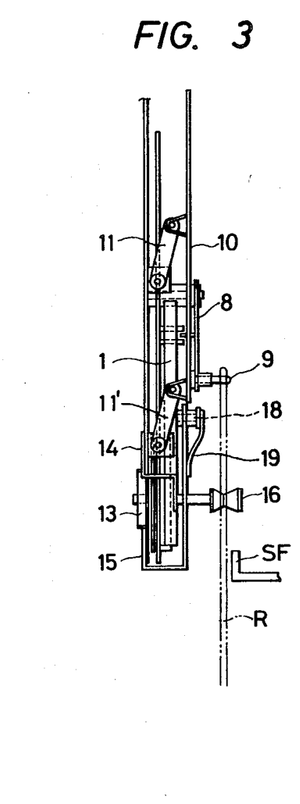
FIG. 3 is a side view showing the centering mechanism shown in FIG. 1.
Figure 4:
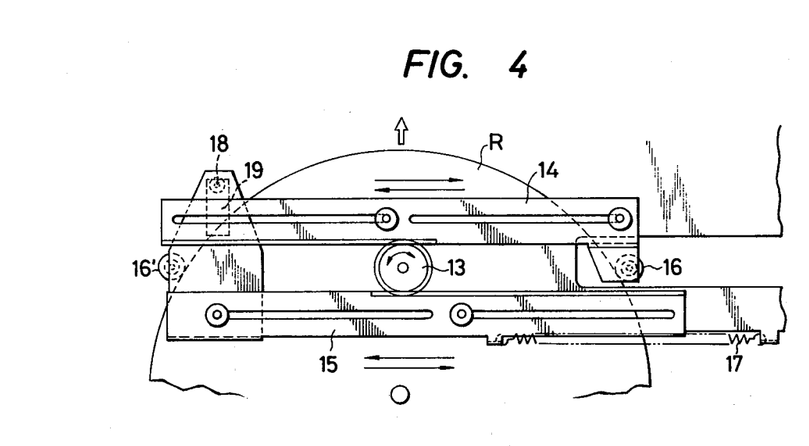
FIG. 4 is a plan view showing a guide roller device used in the centering mechanism shown in FIG. 1.
Figure 5:
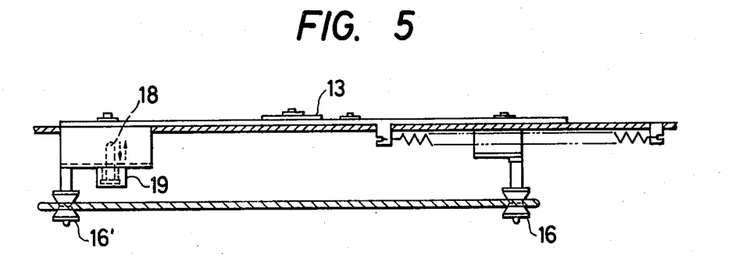
FIG. 5 is a front cross-sectional view showing the guide roller device shown in FIG. 4.

FIG. 1 is a plan view showing the centering mechanism for detecting the size of the inserted record disc and for centering the record disc. FIGS. 2 and 3 are front and side views thereof, respectively. A slide surface SF (FIG. 3) is formed at a lower edge of the opening in order to guide the record disc when the disc is inserted. As best shown in FIGS. 4 and 5, racks 14 and 15 which are mutually moved in the opposite direction by a gear 13 are slidably mounted in the lateral direction, the racks being positioned in the vicinity of the opening of the player cabinet.

Figure 6:
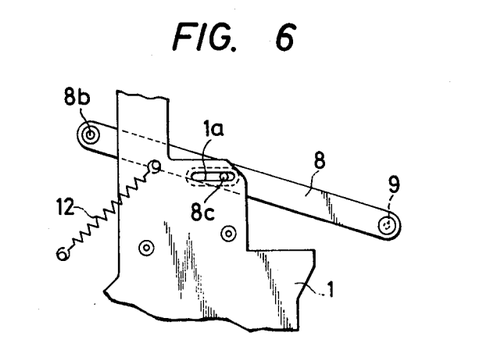
FIG. 6 is a plan view showing a detecting arm used in the centering mechanism shown in FIG. 1.
Figure 7:
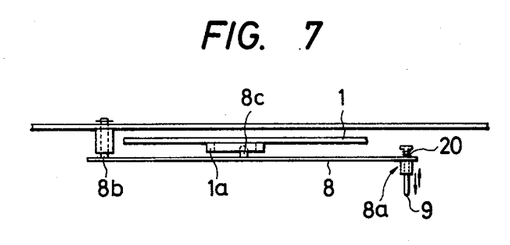
FIG. 7 is a front view showing the detecting arm shown in FIG. 6.

Guide rollers 16 and 16' are provided at a right end portion of the rack 14 and a left end portion of the rack 15, respectively, at an equal distance position from the gear 13 so that when the rollers 16 and 16' are brought into contact with the peripheral edge of the record disc, the racks 14 and 15 are moved in the lateral direction. A lock pin 18 biased upwardly by a leaf spring 19 is implanted at a portion extending rearwardly from the left end of the rack 15 and is selectively engaged with a slide stop plate 1 and a lock plate 2. A reset spring 17 coupled to the rack 15 serves to restore the racks 14 and 15 to the position shown in FIG. 1. On the rear side of the racks, a detecting arm 8 having a detecting pin 9 is supported rotatably in the horizontal plane around its left end 8b and is biased clockwise by a spring 12 as shown in FIGS. 6 and 7. The detecting pin 9 is biased upwardly by a coil spring 20 (FIG. 7) and is depressed at its upper end by a guide plate 10 so that the detecting pin 9 is lowered to a position where it is in abutment with the outer periphery of the inserted record disc. A drive pin 8c is implanted at an intermediate portion of the detecting arm 8 and is engaged with a guide groove 1a formed in the slide stop plate 1. The slide stop plate 1 is supported to be movable back and forth. The slide stop plate 1 includes a guide wall 1c which may abut against the lock pin 18 formed in the rack 15, projections 1d and 1e, the guide groove 1a with which the drive pin 8c of the detecting arm 8 engages, and a microswitch 3 which may be actuated by the lock plate 2 as best shown in FIG. 8.

Figure 8:
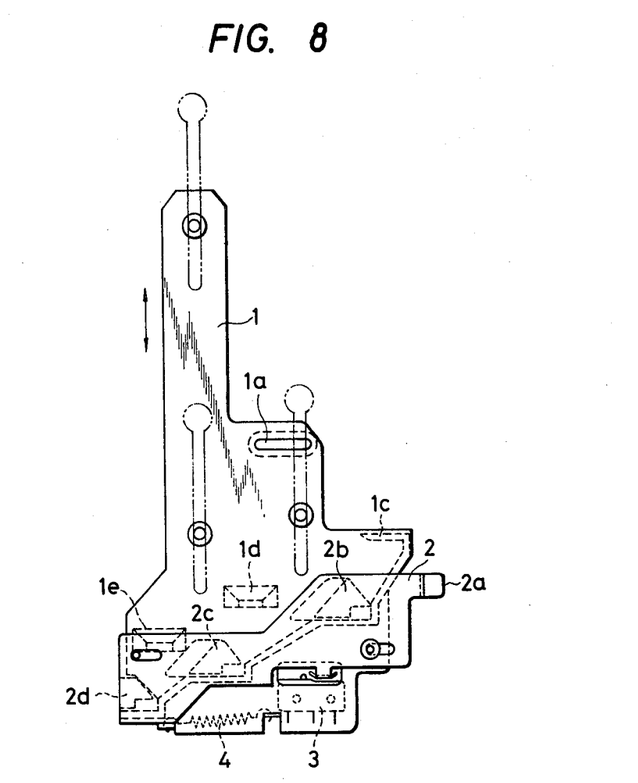
FIG. 8 is a plan view showing a slide stop plate and a lock plate shown in FIG. 1.
Figure 9:
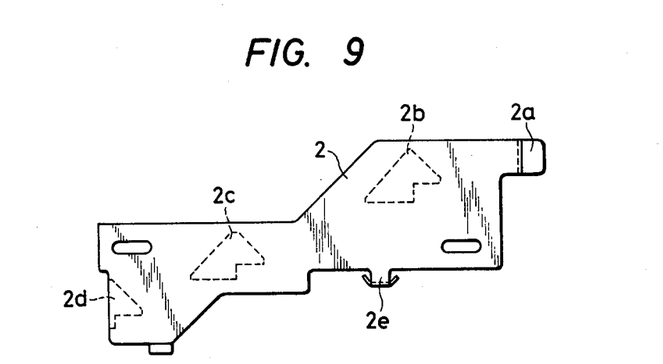
FIG. 9 is a plan view showing the lock plate shown in FIG. 8.
Figure 10:
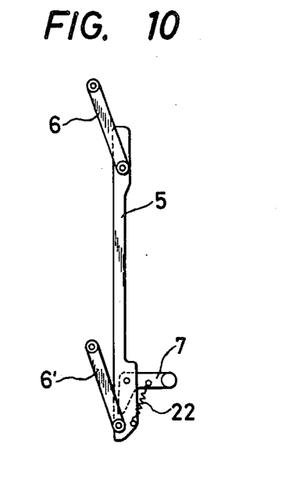
FIG. 10 is a plan view showing a reset plate shown in FIG. 1.

The lock plate 2 is provided and is movable in the lateral direction on the slide stop plate 1 and is biased to the right in FIG. 8 by a spring 4 coupled to the slide stop plate 1. On the lock plate 2 are formed retaining portions 2b, 2c and 2d which are each engageable with the lock pin 18 by the assistance of the guide wall 1c and a projecting portion 2a which is to be depressed by the reset plate 5 when the engagement between the retaining portion 2b, 2c or 2d and the lock pin 18 is released. Further, as shown in FIG. 9, the lock plate 2 is provided with an actuating member 2e which actuates the microswitch 3 when the lock plate 2 is moved leftwardly. As shown in FIG. 10, the reset plate 5 is supported at both ends by two arms 6 and 6' which are each rotatable in the horizontal plate to thereby horizontally move the reset plate 5 in parallel. Furthermore, the reset plate 5 is provided with a pivotable L-shaped lever 7 which is biased clockwise by a spring 22 and is engaged with a camming portion 58b of another rack 58 described later. The L-shaped lever 7 is so provided that it is rotated in the counterclockwise direction with the spring 22 extending and is disengaged from the cam portion 58b of the rack 58 when the rack 58 is moved on the rearside during the record disc inserting.

Figure 11:
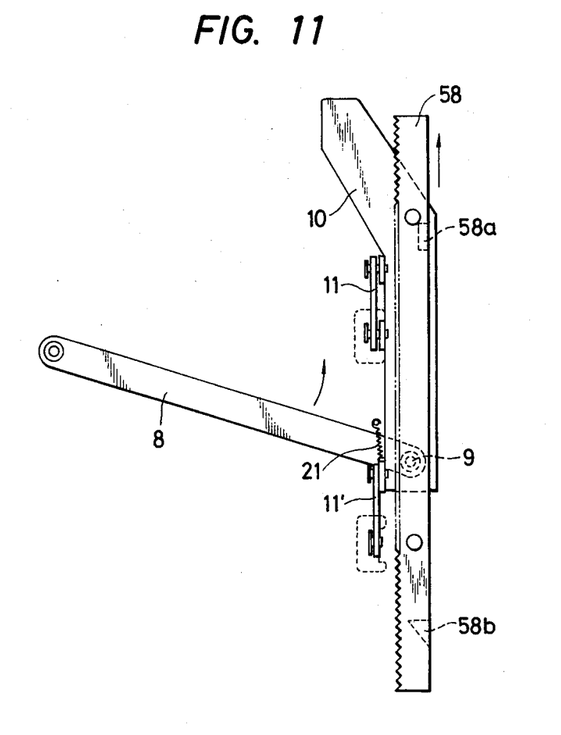
FIG. 11 is a plan view showing a guide plate shown in FIG. 1.
Figure 12:
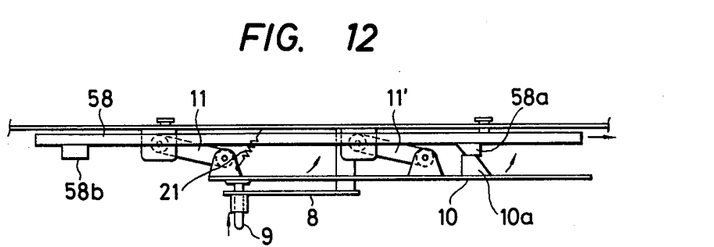
FIG. 12 is a side view showing the guide plate.
Figure 13:
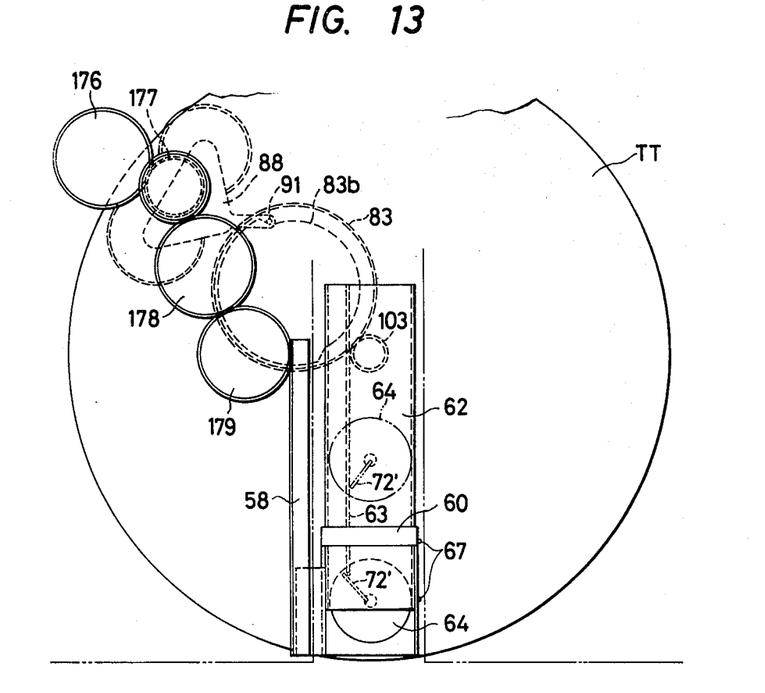
FIG. 13 is a plan view showing a record disc transferring device according to the present invention.
Figure 14:
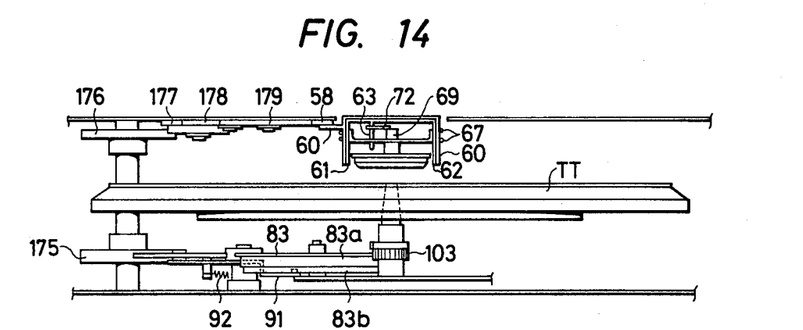
FIG. 14 is a front view showing the record disc transferring device shown in FIG. 13.
Figure 15:
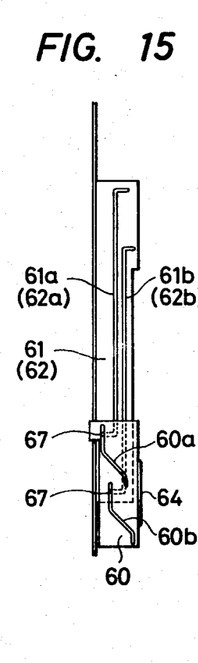
FIG. 15 is a side view showing the record disc transferring device shown in FIG. 13.

The guide plate 10 is supported so as to move up and down in parallel by the two rotatable arms 11 and 11' and at the same time, the plate 10 is biased upwardly by a spring 21 as shown in FIGS. 11 and 12. By the guide plate 10, the detecting pin 9 provided on the detecting arm 8 is depressed downwardly whereby the detecting pin 9 is positioned so as to be in contact with the outer periphery of the inserted record disc. As shown in FIGS. 13 to 15, the rack 58 to which a drive guide 60 is fixed is supported movably back and forth. A cam member 58a fixed to the underside of the rack 58 is in abutment with a cam member 10a on the guide plate 10.

Figure 16:
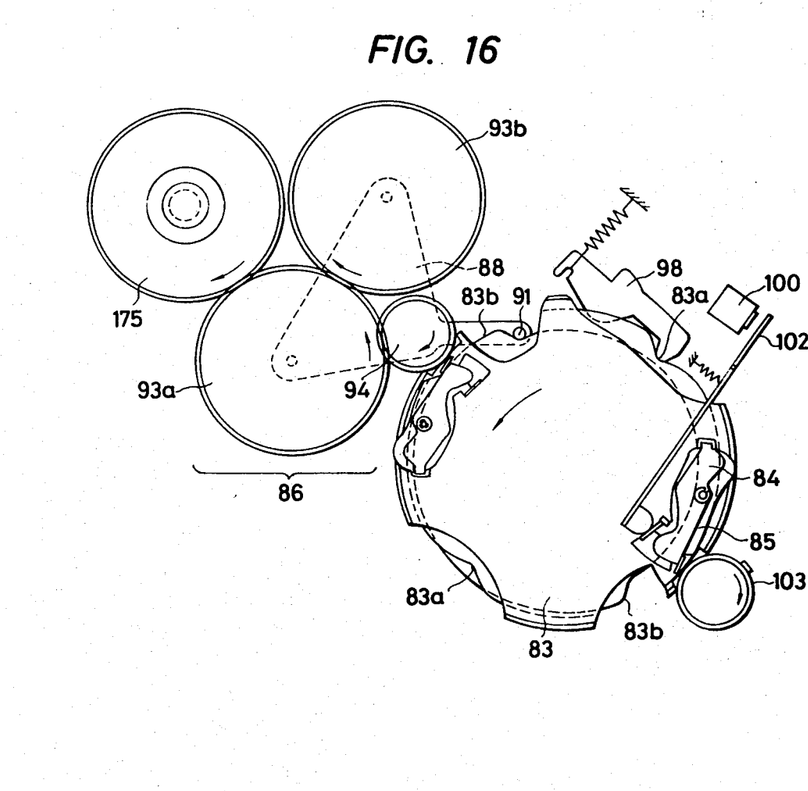
FIG. 16 is a plan view showing a drive direction change-over mechanism according to the present invention.
Figure 17:
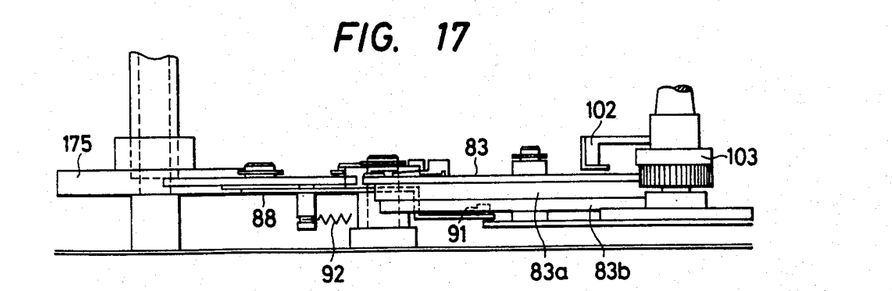
FIG. 17 is a front view showing the drive direction change-over mechanism shown in FIG. 16.

The rack 58 is driven by a pinion gear 103 fixed to the turntable shaft, through a drive cam 83 with a toothed wheel having two cutaway portions, a drive direction changeover assembly 86 and transmission gears 175, 176, 177, 178 and 179 as shown in FIGS. 13, 14, and 16. As shown in FIG. 16, a start plate 84 and a signal plate 85 are provided on the drive cam 83 so as to face the above described two cutaway portions. The rotation of drive cam 83 is commenced by a relay 100 and an actuating plate 102. Cam portions 83a used for determining the stop position cooperating with the abutment of a lock plate 98 and slide surfaces 83b each having a stepped portion against which a drive pin 91 of the assembly 86 abuts are coaxially fixed to the drive cam.

The drive direction change-over assembly 86 includes three gears 93a, 93b and 94 which are rotatably supported on a swing plate 88 having an arm at which a drive pin 91 is fixed. With such an arrangement, the assembly is changed in its rotational direction by every one half rotation of the drive cam 83. In compliance therewith, the transmission gear 175 is selectively engaged with the gear 93a and the gear 93b to thereby rotate the transmission gears 175 to 179 in the opposite direction. Then the drive direction of the rack 58 is reversed.

As shown in FIG. 15, guide plates 61 and 62 are fixedly provided in parallel to the movement direction of the rack 58, that is, back and forth with respect to the player cabinet. A pair of guide slots 61a and 61b (62a and 62b) each of which is curved at a front end upwardly and at a rear end downwardly are formed in the guide plate 61 (62). The drive guide 60 fixed to the rack 58 is supported slidably on the guide plates 61 and 62. A pair of slant slots 60a and 60b are formed in each vertical walls of the drive guide 60. A spindle assembly 64 which holds the inserted record disc at its center hole is engaged with the slots of the guide plate 61 and 62 and the slant slots of the drive guide 60 through four guide pins 67 (FIGS. 13 to 15). Thus, as the rack 58 is moved rearwardly, the spindle assembly 64 is initially lowered along the curved portion of the front end of the guide slots and, subsequently, the assembly 64 is moved rearwardly horizontally. Then, when the assembly 64 reaches the turntable, it is further lowered along the curved portion of the rear ends of the guide slots 61a, 61b, 62a and 62b.

Figure 18:
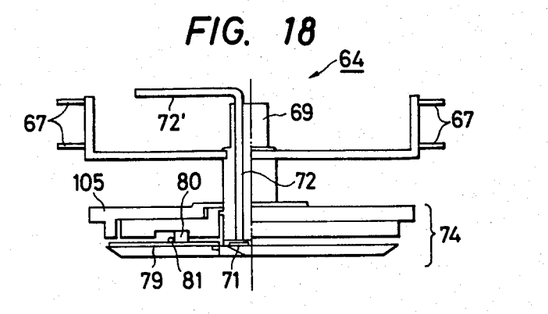
FIG. 18 is a front view showing the spindle assembly according to the present invention.

As shown in FIG. 18, a holder 71 for a relatively small center hole of the record disc is provided with respect to the spindle assembly 64.

Figure 19:
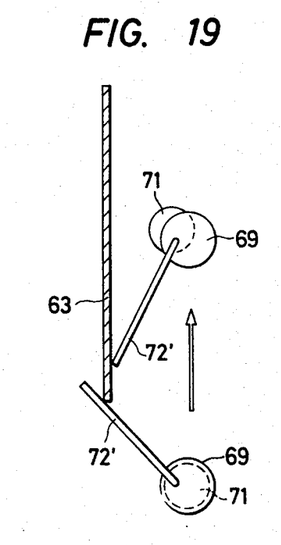
FIG. 19 is a view illustrating an operation of a holder used in the spindle assembly shown in FIG. 18.
Figure 20:
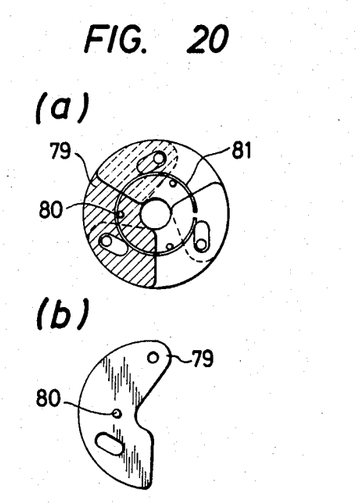
FIG. 20(a) is a plan view of another holder having plural segments.
FIG. 20(b) is a plan view of the single holder segment shown in FIG. 20(a)

The holder member 71 for a relatively small center hole is provided eccentrically with respect to the center spindle 69 and the holder member 71 may be retracted or projected horizontally by rotation of a rotary shaft 72. As shown in FIG. 20, a plurality of holder members 79 for holding a record disc having a relatively large center hole are provided at an adapter assembly 74 supported so as to be slidable vertically on the center spindle 69. As shown in FIG. 18, the eccentric holder 71 as a whole is positioned within an opening defined by the holder members 79 so that the holder 71 may radially outwardly push the holder members 79 against the force of the ring spring 81 when the large hole record disc is clamped by the adapter assembly. This construction is very simple and convenient for clamping the record disc. A bent portion 72' is formed at the upper end portion of the rotary shaft 72. As the spindle assembly 64 is moved rearwardly, the bent portion 72' is brought into contact with an angle plate 63 and is rotated counterclockwise. As a result, the holder member 71 projects to the position where it engages with the center hole of the record disc as shown in FIG. 19. Three holders 79 for relatively large center holes are normally biased inwardly by a spring 81 laid over pins 80. When the holder 71 for the small hole projects, the large hole holder members 79 are pushed from the inside to project to the position where they engage the large center hole of the record disc.

Figure 21:
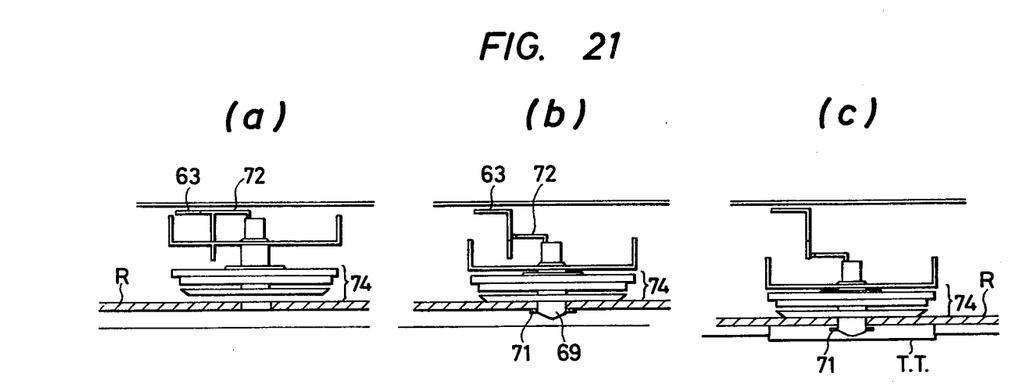
FIGS. 21(a) to (c) show the operation of the holder shown in FIG. 19.

As shown in FIG. 21, when the spindle assembly 64 is lowered onto the record disc having a small hole, an adapter assembly 74 is stopped in abutment with the periphery of the center hole of the record disc. Then, the holder member 71 is solely lowered into the center hole of the record disc.

Figure 23:
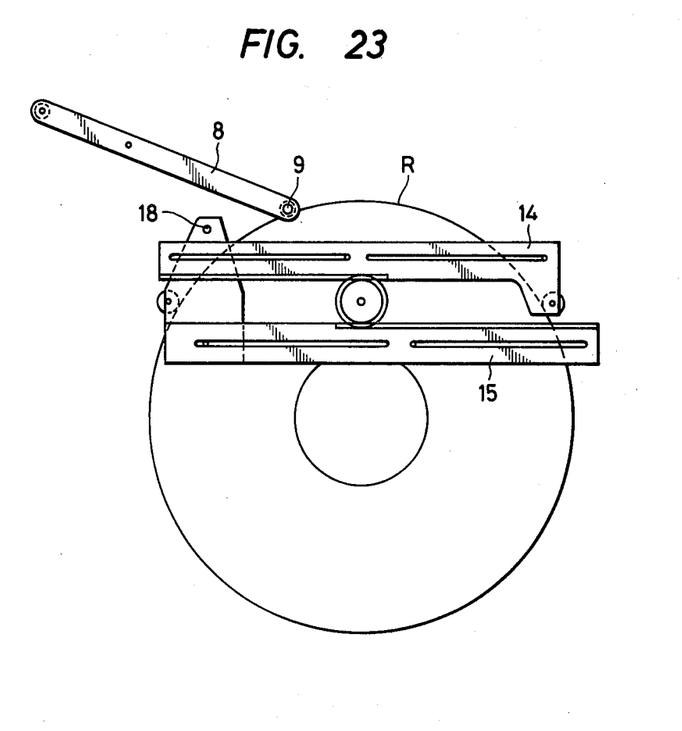
FIGS. 23 and 24 show the operation of the centering mechanism according to the present invention.
Figure 24:
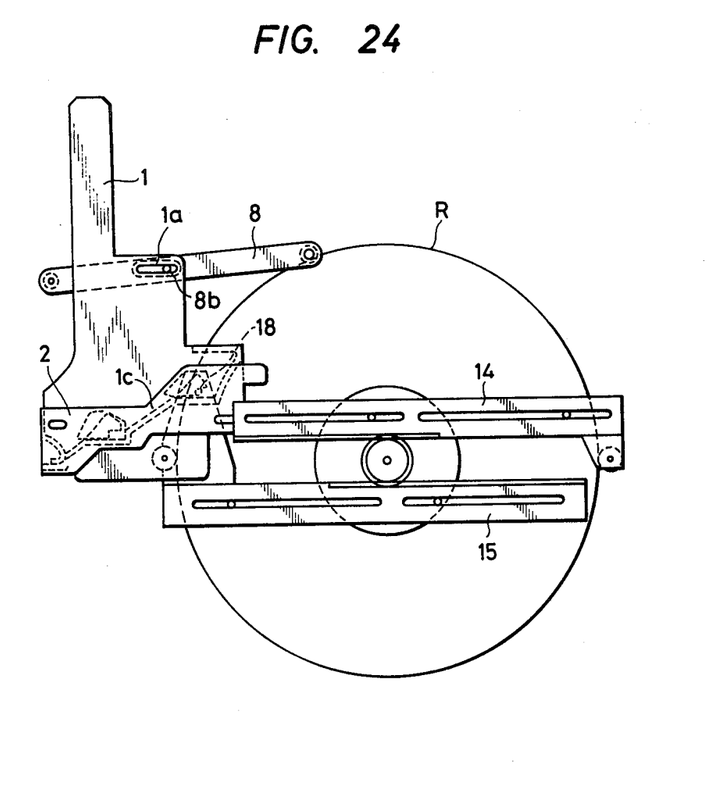

The operation of the thus constructed record player will now be described. When the record disc R is inserted through the opening, the outer periphery of the record disc is in abutment with the guide rollers 16 and 16' as shown in FIG. 23. Then the rack 14 and the rack 15 are moved in the lateral direction, to the right and the left. When the record disc is further inserted, the record disc comes in contact with the detecting pin 9 of the detecting arm 8 to thereby rotate the detecting arm 8 in the rearward direction. As the detecting arm 8 is rotated, the slide stop plate 1 is moved rearwardly, as shown in FIG. 24. When the center hole of the record disc is positioned at the lowering position of the center spindle 69, the lock pin 18 of the rack 15 is brought into contact with the guide wall 1c of the slide stop plate 1 to thereby prevent further movement of the slide stop plate 1 and the detecting arm 8. The guide wall 1c has slant portions with respect to the moving direction of the slide stop 1. The contacting position of the guide wall 1c against the lock pin 18 is changed according to a size of the record disc, i.e., the movement of the rack 15 is such that any record disc is centered at the constant position. Just before the lock pin 18 comes in contact with the guide wall 1c, the lock pin 18 abuts against any one of the projections 2b, 2c and 2d of the lock plate 2 according to the size of the record so that the lock plate 2 is lightly moved in the left direction. By the movement of the lock plate 2, the microswitch 3 is actuated to thereby generate a signal representing the termination of the centering and the commencement of the successive operation. When the lock pin 18 is dropped into the retaining portion of the projection 2b, 2c or 2d, the lock plate 2 is again moved in the right direction by the spring 4 to be reset. (FIG. 8).

When the centering operation of the inserted record disc R is finished, the relay (FIG. 16) is actuated by the signal from the microswitch 3 so as to project start plate 84 to face the cutaway portion of the drive cam 83 through the actuating plate 102 and the signal plate 85. The start plate 84 is in contact with the projection fixed coaxially to the pinion gear 103 and allows the drive cam 83 to slightly rotate and to engage with the pinion gear 103 as shown in FIG. 16. Then the drive cam 83 is rotated, the rack 58 is driven through the drive direction change-over assembly 86 and the transmission gears 175 to 179 and is moved rearwardly.

Figure 22:
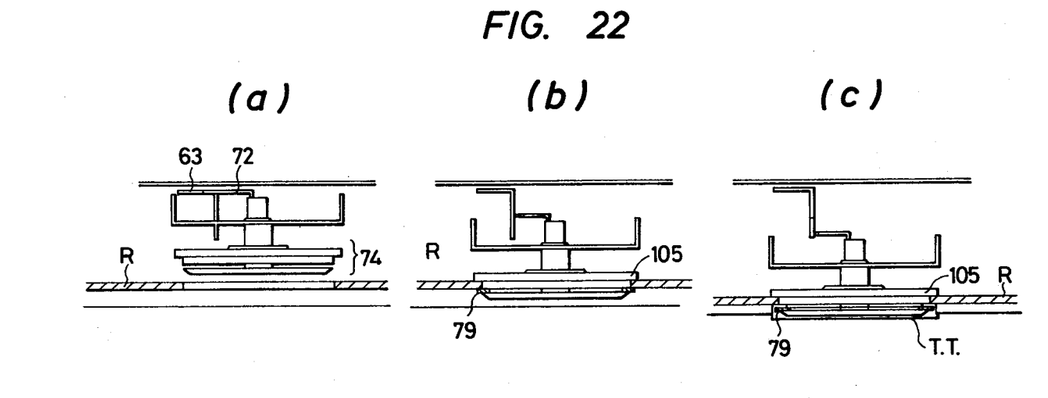
FIGS. 22(a) to (c) show the operation of the holder having segments shown in FIGS. 20(a) and (b)

As the rack 58 is moved rearwardly, the projection 58a on the underside of the rack 58 is disengaged from the cam 10a of the guide plate 10. Then, the guide plate 10 is moved upwardly by the spring 21 to thereby allow the detecting pin 9 of the detecting arm 8 to be lifted to the position where the pin 9 does not prevent the movement of the record disc as shown in FIG. 12. At the same time, the drive guide 60 fixed to the rack 58 is moved rearwardly. The four guide pins 67 which are engaged with the slant slots 60a and 60b are lowered along the slots 61a, 61b, 62a and 62b at their front curved portion and the spindle assembly 64 is lowered to the record disc R (FIG. 15). In case of the small center hole of the record disc, the center spindle 69 is solely inserted into the hole as shown in FIG. 21 whereas in case of the large center hole, the overall adapter assembly 74 is inserted into the center hole of the disc as shown in FIG. 22.

When the rack 58, that is, the drive guide 60 is moved rearwardly, the spindle assembly 64 is also moved rearwardly in the horizontal plane. Then, the bent portion 72' of the rotational shaft 72 is brought into contact with the angle plate 63 and rotated counterclockwise. Then, the holder 71 or the holders 79 project on the underside of the record disc to thereby hold the record disc. When the spindle assembly 64 reaches the upper portion of the turntable TT, the guide pin 67 is lowered along the rear bent portion of the guide slots of the guide plates and the spindle 64 allows the record disc to be lowered to the turntable. The record disc is depressed and held on the turntable by the adapter assembly 74 or the depression member 105. The holder 71 (or holders 79) is further lowered and is separated from the record disc (FIG. 21(c) and 22(c)). At this time, the drive cam 83 is rotated and stopped at a position where the opposite cutaway portion thereof faces the pinion gear. The tone arm (not shown) is lowered onto the record disc groove and begins playing by a well known tone arm lead-in mechanism.

When the play is finished and the tone arm reaches the lead-out groove, the tone arm is returned by an automatic returning mechanism well known in the art. At the same time, the relay 100 is actuated to rotate the drive cam 83. The drive pin 91 of the drive direction change-over assembly 86 is now in contact with a large diameter portion of the slide surface 83b of the drive cam 83 and is swung in the opposite direction to that of the record disc insertion to thereby move the rack 58 forwardly (FIG. 16).

When the rack 58 is moved forwardly, the spindle assembly 64 allows the record disc to be transferred to the centering position and released in the same course as in the record disc insertion. Then, the assembly 64 is lifted and separated from the record disc. The guide plate 10 is lifted by the projection 58a of the rack 58 and the detecting pin 9 of the detecting arm 8 is lowered by the guide plate 10. Also, the cam portion 58b of the rack 58 is in contact with the lever 7 of the reset plate 5 so that the reset plate 5 is moved in the left direction, and so that the projection 2a of the lock plate 2 is pushed and slid in the left direction. As a result, the lock pin 18 is released from the projection 2b, 2c or 2d. The detecting arm 8 is rotated in the clockwise direction by the reset spring 12. The detecting pin 9 is in contact with the outer periphery of the record disc and is moved forwardly.
wardly, and the slide stop 1 is stopped in the state where the record disc center is exposed, with the lock pin 18 contacting with the projection 1d or 1e to thereby prevent the further rotation of the detecting arm 8.

When the record disc is picked up manually, the lock pin 18 of the rack 15 is moved in the right along the front surface of the projection 1d or 1e of the slide stop 1 and is disengaged therefrom. Then, the slide stop 1 is moved forwardly, and the detecting arm 8, and racks 14 and 15 are returned to the original positions.

Figure 25:
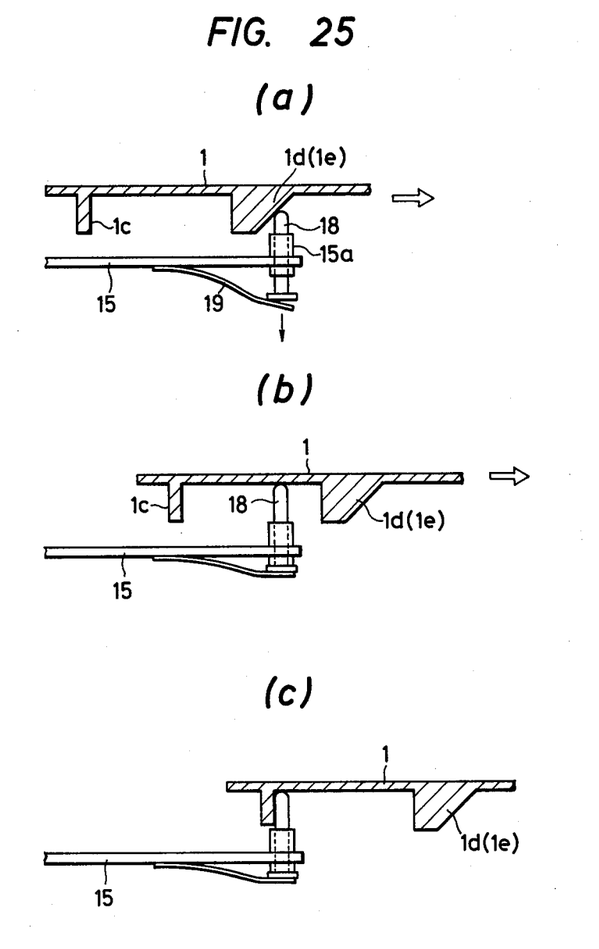
FIG. 25(a) to (c) shows the operation of a lock pin according to the present invention.

It should be noted that since the rearsides of the projections 1d and 1e of the slide stop plate 1 are formed in slant surfaces, if the lock pin 18 of the rack 15 is abutted against slide stop plate 1 when the slide stop is moved rearwardly midway during the record insertion, the slide stop plate 1 may ride over the lock pin 18 as shown in FIGS. 25 (a) to (c).

As described above, the present invention provides an automatic loading player in which the retaining means for transferring and holding the inserted record disc to the turntable is built in the center spindle, and the record disc is held at its center hole whereby any undesirable force is not applied to the record disc. Further, with such a simple construction, a positive operation of holding and transferring may be ensured.

What is claimed is:

1. An automatic record disc loading player comprising:
   a horizontally movable center spindle (69); and means for holding a record disc, and means for holding including an eccentric member (71) and a rotatable lever (72), said eccentric member being retractable into and radially projectable from said center spindle in response to the rotation of said lever, said lever having a first portion substantially parallel to an axis of said center spindle, and a second engagement portion for receiving a force tending to rotate said first portion.

2. The player of claim 1, in which said rotary lever includes said first portion (72) and a bent second, engagement portion, said bent portion being pivotable about the axis of said first portion in response to the engagement of said bent portion with an abutment member during horizontal movement of said center spindle, to project said eccentric member from said center spindle.

3. The player of claim 2, in which said bent portion is normally biased in one direction.

4. The player of claim 1, further comprising means for slightly lowering said holding means (71) after the record disc is lowered onto said turntable to slightly separate said holding means from the record disc.

5. An automatic record loading player comprising:
   a turntable;
   a center spindle (69) engageable with a relatively small center hole of a first type of record disc;
   first holder means (71) for holding the first type of record disc at the center hole thereof at least until after said record disc is supported on said turntable;
   means for retracting and projecting said first holder means into and from said center spindle, respectively;
   an adapter assembly (74) engageable with a relatively large center hole of a second type of record disc, said adapter assembly including second holder (79) which defines an opening which selectively accommodates said first holder means, said first holder means being vertically movable relative to said second holder means into and out of said opening; said adapter assembly being vertically movable with respect to said center spindle such that said center spindle may project outwardly of a record disc engaging surface of said adapter assembly to engage to said relatively small center hole of said first type of record disc.

6. The player of claim 5, wherein said first holder means projects said second holding means radially outward only when said adapter assembly is in a lowered position with respect to said center spindle and said first and second holder means are disengaged from one another when said adapter assembly is in a raised position with respect to said spindle.

7. The player of claim 6 wherein said center spindle includes a rotatable arm (72) rotatable in abutment with a stationary angle member (63), said first holder means including an eccentric rotatable member (71) fixed to said rotatable arm, said second holder means including a plurality of holder segments (79), said biasing means including a spring ring (81) for normally biasing said holder segments inwardly, said holder segments defining said opening which is located in a center of said second holder means.

8. An automatic record loading player comprising means (58) for delivering a record disc from a first horizontal position, whereat said record disc is centered relative to a center spindle (69) displaced along a horizontal direction from a turntable (TT), to a second horizontal position whereat said record disc is positioned on said turntable; drive cam means (83) selectively engaging with a turntable shaft (103) and alternately rotating through first and second half turns, said drive cam means including coaxial slide surfaces (83b) provided on its circumferential periphery and each extending around substantially one half of said periphery; and a drive direction change-over assembly (86) for contacting with said slide surfaces and transmitting a rotational torque of said drive cam means to said means for delivering whereby the direction of movement of said means for delivering is changed every one half rotation of said drive cam means.

9. The player of claim 8, further including means for starting a rotational transmission between said turntable shaft and said drive cam means, said means for starting including an actuating means having an acutating plate (102) and a signal transmission plate (85), said drive cam means including a toothed wheel (83) having two cutaway portions formed thereon at diametrically opposite positions, said cutaway portions facing said turntable shaft (103) when the drive cam means is at a standstill, said drive cam means including a stop ensuring means (83a, 98) for stopping said toothed wheel.

10. The player of claim 9, wherein said drive direction change-over assembly includes a contact pin (91) contacting with one of said slide surfaces, a torque transmission wheel (94) which faces said cutaway portions of said toothed wheel when said drive cam means is at a standstill, a pair of gears (93a, 93b) one of which engages with said torque transmission wheel, and a swingable biased plate (88) on which said contact pin, said torque transmission wheel, and said gears are suitably mounted, said swingable biased plate swinging between first and second positions during said first and second half turns, respectively, of said drive cam means to selectively and alternately engage one of said gears with a torque transmission gear train (175, etc.) to transmit force to said means for delivering.

11. The player of claim 8, wherein said record disc delivering means includes drive guide means (60) for transferring a spindle assembly for holding said record disc at a center hole thereof along stationary guide grooves (61a, b; 62a, b) between said first and second positions.

12. An automatic record disc loading player comprising a turntable (TT); a spindle assembly (64) for holding an inserted record disc at a center hole of the record disc, said spindle assembly having guide pins (67); stationary members having guide grooves (61a, b; 62a, b) corresponding to a length from a record disc insertion position to a center of said turntable, said guide grooves being curved upwardly at the position corresponding to the record disc insertion position and being curved downwardly at the position corresponding to the center of said turntable; and drive guide means (60) including slant grooves for moving said spindle assembly along said guide grooves, said guide pins of said spindle assembly engaging with said guide grooves and said slant grooves.

13. An automatic record disc loading player comprising;
a pair of racks (14, 15) moving in the opposite direction to each other, said racks being slidably supported in a lateral direction;
two guide rollers (16, 16') for contacting with an outer periphery of a record disc, said guide rollers being provided on respective ones of said racks;
a slide stop plate (1) movable horizontally substantially along the plane of said disc;
a record disc detecting pin (9) for abutting against the outer periphery of the record disc, said slide stop plate being movable in correspondence with movement of said record disc detecting pin;
a lock pin (18) formed on one end portion of one of said racks; and
a guide wall (1c) formed in said slide stop plate and obliquely formed in the moving direction of said slide stop plate, said lock pin being abuttable against said guide wall to prevent further movement of said stop plate and detecting pin at the desired center position of said disc; whereby an inserted record disc of any size can be suitably centered at a predetermined position.

14. The record player of claim 13, wherein said record disc detecting pin (9) is formed on a rotatable detecting arm (8) and a drive pin (8c) of said detecting arm is engaged with a groove (1a) extending in a lateral direction in said slide stop plate.

15. The player of claim 13, whereby at least one projection (1d, 1e) extends from said slide stop plate and is positioned on the rear side of said guide wall so that the projection may be brought into contact with said lock pin (18) when the record disc is delivered to the outside, and wherein when the record disc is to be delivered to the outside, said slide stop plate is moved forwardly and the record disc is pushed forwardly from the centering position of the record disc by said record disc detecting pin until said lock pin comes into contact with said projection.

16. The player of claim 15, wherein a rear side surface of said projection is formed in a slant surface, and when the slide stop plate is moved rearwardly during the record insertion, and lock pin is adapted to ride over said projection along said slant surface.

17. An automatic record disc loading player comrising:
a record disc detecting arm (8) rotatable around a stationary end in a horizontal plane;
a record disc detecting pin (9) formed at the other end of said record disc detecting arm and retractable in a vertical direction, said record disc detecting pin being abuttable against an outer periphery of a record disc when said record disc detecting pin is projected from said detecting arm;
means (20) for normally biasing said record disc detecting pin upwardly;
a guide plate (10) vertically movably supported above said record disc detecting arm for depressing said record disc detecting pin downwardly; and
rack means (58) movable in a horizontal direction in correspondence with movement of the record disc to thereby move said guide plate up and down, whereby when the record disc is automatically delivered inserted to a position which is centered relative to a spindle, said detecting pin is lifted up out of the path of the record disc to allow further movement thereof.

18. An automatic record disc loading player comprising:
- a pair of guide rollers (16, 16′) each moving in the opposite direction in a horizontal plane while abutting against an outer periphery of a record disc when the record disc is inserted into said player;
- a record disc detecting pin (9), said detecting pin abutting an outer periphery of said record disc as said record disc is inserted into said player and being moved rearwardly as said record disc is inserted into said player;
- a slide stop plate (1) movable rearwardly and forwardly in correspondence with movement of said record disc detecting pin;
- a lock pin moving together with one of said guide rollers;
- a lock plate (2) supported movably on said slide stop plate in a lateral direction and having a plurality of retaining portions for retaining said lock pin; and
- a reset plate (5) for moving said lock plate and releasing said lock pin when the record disc is delivered to the outside; whereby in accordance with a size of the record disc, said lock pin is retained by a suitable selected one of said plurality of retaining portions of said lock plate.

19. An automatic record disc loading player comprising:
- a stationary chassis;
- a stationary angle member (63);
- a turntable having a shaft (103);
- a pair of racks (14, 15) movable in opposite directions to each other, said racks being slidably supported in a lateral direction of said chassis and one of said racks having a lock pin (18) formed on one end thereof, said racks being spring-biased in a predetermined direction;
- two guide rollers (16, 16′) for contacting with an outer periphery of a record disc, said guide rollers being each mounted on a respective one of said racks;
- a slide stop plate movable back and forth substantially parallel to the plane of said disc, said slide stop plate including a guide wall (1c) formed in said slide plate obliquely with respect to the moving direction of said slide stop plate, said guide wall being abuttable against said lock pin to suitably center a record disc of any size at a predetermined position;
- a microswitch (3) mounted on said slide stop plate;
- a record disc detecting lever (8) normally biased in one direction and rotatably supported at an end to said chassis and having a pin (8c) implanted at its intermediate portion and a record disc detecting pin (9) at the other end, said record disc detecting pin being biased upwardly out of the path of said disc but abutting against the outer periphery of the record disc in its lowered position, said pin (8c) implanted at the intermediate portion of said detecting lever being engaged with a slot (1a) formed in a lateral direction of said stop slide plate;
- a plurality of projections (1d, 1e) extending from said slide stop plate and each having an oblique surface on its rear side, said projections being positioned on the rear side of said guide wall so that one of side projections may be brought into contact with said lock pin (18) when the record disc is delivered to the outside;
- a guide plate (10) biased upwardly and vertically movably supported above said record disc detecting lever for depressing said record disc detecting pin (9) downwardly, said guide plate being biased to move upwardly and having a first cam portion (10a);
- a spindle driving rack means (58) movable in a horizontal direction in correspondence with movement of the record disc to thereby move said guide plate up and down;
- a second cam portion (58a) included on said spindle driving rack means for engaging said first cam portion to prevent upward movement of said guide plate (10);
- a lock plate (2) biased in a lateral direction, supported movably on said slide stop plate in the lateral direction and having a plurality of retaining portions (2b, 2c, 2d) for retaining said lock pin;
- a reset plate (5) for moving said lock plate and releasing said lock pin when the record disc is delivered to the outside;
- a spindle assembly (64) for holding an inserted record disc at a center hole of the record disc, said spindle assembly having guide pins;
- stationary members fixed to said chassis and having guide grooves formed therein;
- drive guide means (60) including slang grooves for transferring said spindle assembly along said guide grooves, said guide pins of said spindle assembly being engaged with said guide grooves and said slant grooves;
- said spindle assembly including a center spindle (69) engageable with a relatively small center hole of a record disc, first holder means (71) for holding the record disc at the center hole thereof, said first holder means being retractable into and radially projectable from said center spindle; an adapter assembly (74) engageable with a relatively large center hole of a record disc, said adapter assembly being formed coaxially with said first holder means, and a second holder means (79) retractable into and radially projectable from said adapter assembly, said adapter assembly being vertically movably supported with respect to said center spindle, said first and second holder means cooperating with each other when said adapter assembly is lowered with respect to said center spindle and disengaging from one another when said adapter assembly is raised with respect to said center spindle, said center spindle including a rotatable arm (72) rotatable in abutment with said stationary angle member, said second holder means including a plurality of holder segments (79) and a spring ring (81) for normally biasing said holder segment inwardly, said holder segments defining an opening in a center of said second holder means, and said first holder means being insertable into said opening;
- means for delivering a record disc from a first position to a second position, said means for delivering including: torque transmitting gear grains; said spindle driving rack means (58), drive cam means selectively engaging with said turntable shaft and intermittently rotatable through first and second half turns, said drive cam means (83) including coaxial first and second slide surfaces (83b) provided on its circumferential periphery and extending around respective first and second half turns; a drive direction change-over assembly (86) for contacting with said slide surfaces and transmitting a rotational torque of said drive cam means to said means for delivering; means for starting a rotational transmission between said turntable shaft and said drive cam means, said means for starting including an actuating means (102); and relay means (100) for allowing said means for starting to be operable, said drive cam means including a toothed wheel (83) having two cutaway portions formed thereof at diametrically opposite positions, said cutaway portions facing said turntable shaft when the drive cam means is at a standstill, said drive cam means including a stop ensuring means (83a, 98) for stopping said toothed wheel, said drive direction change-over assembly (86) including a contact pin (91) contacting with said slide surfaces, a torque transmission wheel (94) which faces said cutaway portions of said toothed wheel when said toothed wheel is at a standstill, a pair of gears (93a, 93b) one of which engages with said torque transmission wheel, and a swingable biased plate (88) on which said contact pin, said torque transmission wheel and said gears are suitably mounted, whereby when the swingable biased plate is swung, a different one of said pair of gears engages with said torque transmission gear trains during each of said first and second half turns.

20. An automatic record loading player comprising means (58) for delivering a record disc from a first position to a second position; drive cam means (83) selectively engaging with a turntable shaft (103) and alternately rotating through first and second half turns, said drive cam means including coaxial slide surfaces (83b) provided on its circumferential periphery and each extending around substantially one half of said periphery; and a drive direction change-over assembly (86) for contacting with said slide surfaces and transmitting a rotational torque of said drive cam means to said means for delivering whereby the direction of said means for delivering is changed every one half rotation of said drive cam; means for starting a rotational transmission between said turntable shaft and said drive cam means, said means for starting including an actuating means having an actuating plate (102) and a signal transmission plate (85), said drive cam means including a toothed wheel (83) having two cutaway portions formed thereon at diametrically opposite positions, and cutaway portions facing said turntable shaft (103) when the drive cam means is at a standstill, said drive cam means including a stop ensuring means (83a, 98) for stopping said toothed wheel, said drive direction change-over assembly including a contact pin (91) contacting with one of said slide surfaces, a torque transmission wheel (94) which faces said cutaway portions of said toothed wheel when said drive cam means is at a standstill, a pair of gears (93a, 93b) one of which engages with said torque transmission wheel, and a swingable biased plate (88) on which said contact pin, said torque transmission wheel, and said gears are suitably mounted, said swingable biased plate swinging between first and second positions during said first and second half turns, respectively, of said drive cam means to selectively and alternatively engage one of said gears with a torque transmission gear tain (175, etc.) to transmit force to said means for delivering.

* * * * *